US012453398B1

(12) United States Patent
Cuevas et al.

(10) Patent No.: US 12,453,398 B1
(45) Date of Patent: Oct. 28, 2025

(54) SELF DETERMINED WEIGHT CONTAINER

(71) Applicants: Clarissa Alison Cuevas, El Segundo, CA (US); Carlos Cuevas, El Segundo, CA (US)

(72) Inventors: Clarissa Alison Cuevas, El Segundo, CA (US); Carlos Cuevas, El Segundo, CA (US)

( * ) Notice: Subject to any disclaimer, the term of this patent is extended or adjusted under 35 U.S.C. 154(b) by 0 days.

(21) Appl. No.: 19/285,870

(22) Filed: Jul. 30, 2025

(51) Int. Cl.
| | |
|---|---|
| *A45C 15/00* | (2006.01) |
| *A45C 5/03* | (2006.01) |
| *G01G 19/52* | (2006.01) |
| *G01G 19/58* | (2006.01) |
| *G01G 21/23* | (2006.01) |
| *G01G 21/28* | (2006.01) |
| *G01G 23/18* | (2006.01) |

(52) U.S. Cl.
CPC ............ *A45C 15/00* (2013.01); *A45C 5/03* (2013.01); *G01G 19/52* (2013.01); *G01G 19/58* (2013.01); *G01G 21/28* (2013.01); *G01G 23/18* (2013.01); *A45C 2200/05* (2013.01); *G01G 21/23* (2013.01)

(58) Field of Classification Search
CPC ........ A45C 13/00; A45C 15/00; G01G 19/52; G01G 19/58; G01G 21/23; G01G 21/28; G01G 23/18
See application file for complete search history.

(56) References Cited

U.S. PATENT DOCUMENTS

| | | | | |
|---|---|---|---|---|
| 2,069,499 A * | 2/1937 | Marin | ............ | G01G 3/02 177/144 |
| 5,773,767 A * | 6/1998 | Collins, Jr. | ............ | G01G 19/56 177/127 |
| 7,084,357 B2 * | 8/2006 | Roberts | ............ | A45C 15/00 177/148 |
| 7,151,231 B2 * | 12/2006 | Kamakau | ............ | A45C 15/00 177/245 |
| 7,161,097 B1 * | 1/2007 | Gorgone | ............ | G01G 19/58 177/245 |
| 7,265,302 B2 * | 9/2007 | Keech | ............ | G01G 19/58 177/245 |
| 7,439,456 B2 * | 10/2008 | Ogunnaike | ............ | A45C 13/00 177/148 |
| 9,870,683 B1 * | 1/2018 | Pious | ............ | A45C 15/00 |
| 10,670,451 B2 * | 6/2020 | Dixon, Jr. | ............ | B65D 79/00 |
| 11,643,228 B1 * | 5/2023 | New | ............ | G01G 21/22 53/452 |

(Continued)

FOREIGN PATENT DOCUMENTS

| | | | | |
|---|---|---|---|---|
| WO | WO-2011113871 A1 * | 9/2011 | ............ | G01G 19/58 |
| WO | WO-2022236148 A1 * | 11/2022 | ............ | G01G 19/58 |

OTHER PUBLICATIONS

Shelf Brackets from Home Depot (Year: 2025).*

*Primary Examiner* — Randy W Gibson

(74) *Attorney, Agent, or Firm* — ALONZO & ASSOCIATES; Arlyn Alonzo

(57) ABSTRACT

Aspects of the disclosure are directed to self determined weight container. In accordance with one aspect, the disclosure includes a space for holding content; a weighing system for measuring a weight value of the content; a weighing system compartment for housing the weighing system, and a floor panel, wherein the placement of the floor panel determines a first area dimension for the space and a second area dimension for the weighing system compartment.

19 Claims, 5 Drawing Sheets

(56) References Cited

U.S. PATENT DOCUMENTS

| | | | |
|---|---|---|---|
| 12,247,865 B1* | 3/2025 | Foster | G01G 23/16 |
| 2006/0266563 A1* | 11/2006 | Kaplan | G01G 23/3742 |
| | | | 177/245 |
| 2017/0328763 A1* | 11/2017 | Parker | G01G 17/04 |
| 2018/0245967 A1* | 8/2018 | Parker | G01G 19/18 |
| 2024/0068863 A1* | 2/2024 | Katsu | G01G 19/58 |

* cited by examiner

SELF DETERMINED WEIGHT CONTAINER

TECHNICAL FIELD

This disclosure relates generally to the field of carrying containers and, in particular, to containers with added helpful features beyond containing contents.

BACKGROUND

Containers are used every day to hold content. Some containers hold liquid content. Some containers hold solid content. Often, the content capacity of a container is important. For example, the size of a container may be a factor for a user to buy a particular container. However, in some instances, the content volume that a container can hold is only one factor in the consideration of choosing a particular container. In other instances, how much weight a container can hold is another factor in choosing a particular container.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a self determined weight container. Accordingly, the present disclosure discloses an apparatus including: a space for holding content; a weighing system for measuring a weight value of the content; a weighing system compartment for housing the weighing system, and a floor panel, wherein the placement of the floor panel determines a first area dimension for the space and a second area dimension for the weighing system compartment.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Containers are used every day by children and by adults, at work and at home. Containers are often chosen for the content they are expected to hold. For example, a bucket (which is a type of container) may be used to hold liquid (e.g., water, etc.). In another example, a bucket may be used to hold solid (e.g., sand, dirt, cement powder, flour, etc.).

There are several types of containers. For example, a luggage (which is a type of container) is used mostly for holding clothes or personal necessities, more often for traveling. In the example of air travel (e.g., travel via aircraft), there is usually a weight limit of a passenger's luggage. And, in air travel, for example, the weight limit of a passenger's luggage may depend on a particular airline and/or the classification of the passenger's seat (e.g., first class, business class, premium economy and economy, etc.). Thus, in one example, knowledge of the weight of a luggage and its content is an important factor for a user.

For example, if an air travel passenger's destination requires changes in aircraft, there may be a need to change the weight of the passenger's luggage between aircraft changes. And, in some locations, there may not be weighing stations readily available. Thus, there is a need to determine the weight of a luggage and its content when an external weighing station is not available.

Figure 1:
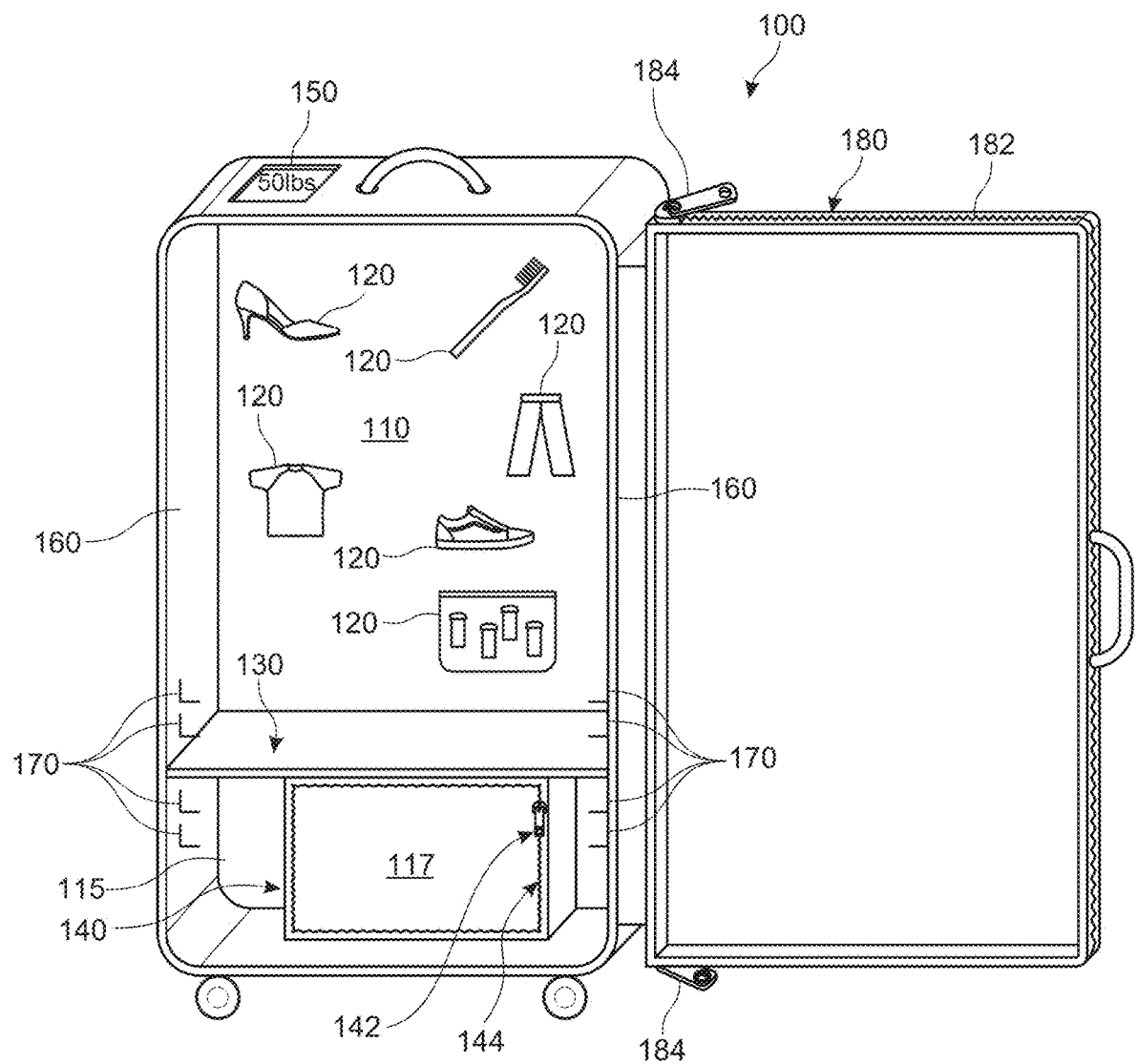
FIG. 1 illustrates an example self determined weight luggage.

FIG. 1 illustrates an example self determined weight luggage 100. In one example, the luggage 100 includes an internal weighing system 140. In one example, the luggage 100 includes space 110 for holding content 120 (e.g., clothes, toiletries, etc.) and an internal weighing system 140 for determining a composite weight of the luggage 100 and its content 120. In one example, the luggage 100 includes a floor panel 130. The floor panel 130 divides the space 110 to create a weighing system compartment 115 for housing the internal weighing system 140. In one example, the weighing system compartment 115 includes a door 117 which will allow access to the internal weighing system 140. In one example, the door may be opened/closed by a zipper 142 being moved along a zipper track 144.

In one example, the placement of the floor panel 130 within the luggage 100 determines a first area dimension for the space 110 and a second area dimension for the weighing system compartment 115. That is, the placement of the floor panel 130 will determine how the internal space of the luggage is divided to make room for the space 110 and the weighing system compartment 115. In one example, the placement of the floor panel 130 is adjustable. For example, if a user replaces the manufacturer provided internal weighing system with another different size and/or shape internal weighing system, the floor panel 130 may be adjusted to accommodate the another different size and/or shape internal weighing system.

In one example, the luggage 100 includes a plurality of wall supports 170 for holding the floor panel 130. In one example, the plurality of wall supports 170 is attached to the sides 160 of the luggage 100 to support the floor panel 130 at its periphery but allows the floor panel 130 to bend as the content 120 is atop the floor panel 130 to allow the internal weighing system 100 to measure the weight value of the content 120 and/or the floor panel 130.

In one example, the floor panel 130 is coupled to the internal weighing system 140 such that any weight felt by the floor panel 130 is registered as a weight value by the internal weighing system 140. In one example, the luggage 100 includes a display 150. In one example, the display 150 includes a battery 151 (not shown), wherein the battery 151 may be replaceable as needed. In one example, the battery 151 is rechargeable. In one example, the display 150 has an ON/OFF button 152 (not shown). In one example, to save power consumption, the display 150 turns OFF automatically after a predetermined time of being in the ON state. In one example, the display 150 may be turned ON/OFF via the ON/OFF button 152 by a user.

In one example, the luggage 100 includes an opening panel 180 for opening and closing the luggage 100. In one example, the opening panel 180 includes one or more zippers 184 associated with one or more zipper track(s) 182.

Figure 2:
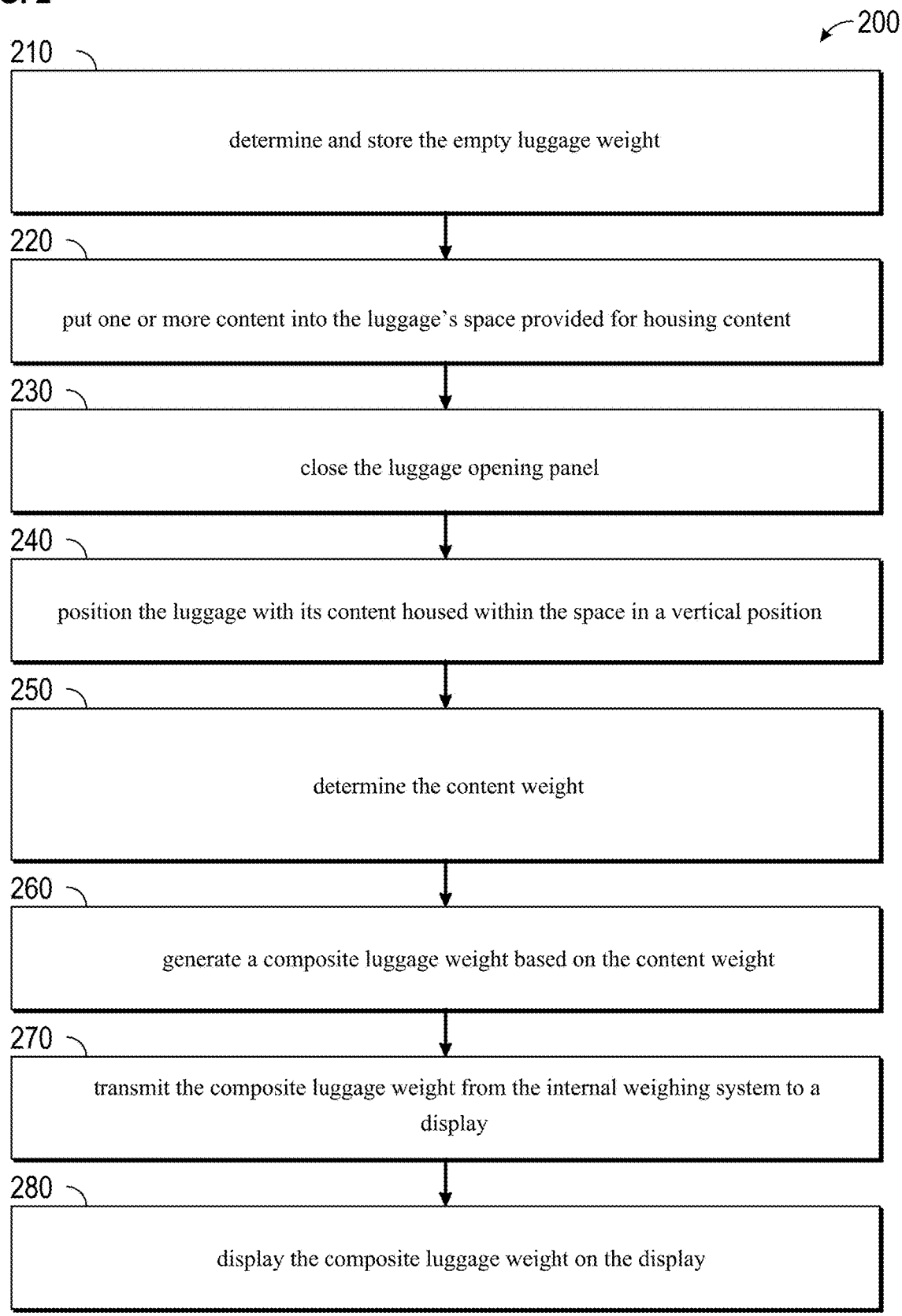
FIG. 2 illustrates an example flow diagram for determining the composite weight of a luggage and its content.

FIG. 2 illustrates an example flow diagram 200 for determining the composite weight of a luggage and its content. In block 210, determine and store the weight of the luggage without content ("empty luggage weight"). In one example, the empty luggage weight may be determined by the manufacturer of the luggage. In one example, the manufacturer of the luggage may input the empty luggage weight to be stored in a memory unit associated with the container (e.g., luggage 100). In one example, the manufacturer or a user may weigh the luggage without content on an external weighing station to obtain the empty luggage weight and then enter the empty luggage weight as an input to the internal weighing system 120. In one example, the empty luggage weight is a baseline weight value. In one example, the empty luggage weight may be a sum of multiple weight values. For example, the empty luggage weight may be a sum of a luggage weight value (without content) and a weight value of one or more external appendages (e.g., a travel sleep pillow, an additional bag to be hooked to the luggage, a water bottle hooked to the luggage, etc.) to be attached to the luggage.

In block 220, put one or more content into the luggage's space provided for housing content. Content may include clothes, toiletries, etc. . . . basically, anything a passenger would like the luggage to house.

In block 230, close the luggage opening panel. In one example, closing the luggage opening panel allows securing the content housed in the space to stay within the space. Closing the luggage opening panel may be achieved by zipping up the luggage to a closed configuration by moving one or both of the zippers along the zipper track.

In block 240, position the luggage with its content housed within the space in a vertical position. In one example, vertical position is defined as having the internal weighing system closest to the ground, the floor panel on top of the internal weighing system and the content on top of the floor panel.

In block 250, determine the content weight. In one example, the content weight is determined by the internal weighing system measuring the weight of the content. In one example, the internal weighing system includes a scale for measuring weight values. Regarding the content weight, since the content sits on top of the floor panel, the content weight being measured by the scale will include the weight of the floor panel.

Figure 3:
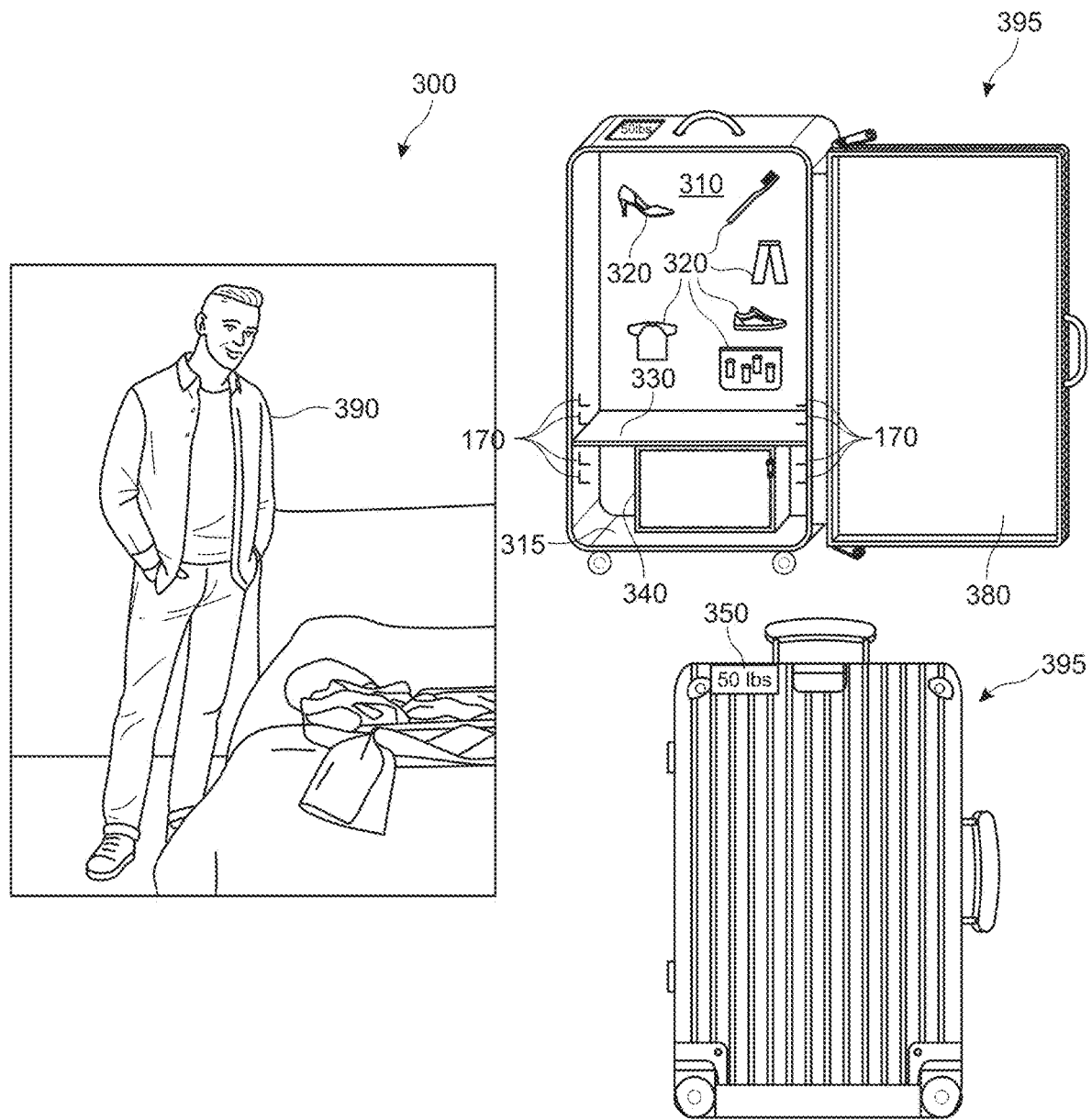
FIG. 3 illustrates an example scenario depicting a passenger at home packing his luggage for air travel.

In one example, the empty luggage weight does not include the weight value of the floor panel 130, 330 (shown in FIGS. 1 & 3). And, in this example, a composite luggage weight is calculated by adding the empty luggage weight and the content weight since the content weight takes into account the weight of the floor panel.

In another example, the empty luggage weight includes the weight of the floor panel. In this example, the composite luggage weight is the sum of the empty luggage weight and the content weight minus (i.e., subtract off) the weight of the floor panel. That is, in this example, the content weight as measured by the scale includes the weight of the floor panel, and since the empty luggage weight also includes the weight of the floor panel, then the floor panel's weight is being added twice. Thus, one value of the floor panel's weight needs to be subtracted off when calculating the composite luggage weight. In one example, the weight of the floor panel is stored in the memory unit of the internal weighing system 140, 500 (shown in FIGS. 1 & 5).

In block 260, generate a composite luggage weight based on the content weight. In one example, the empty luggage weight may include more than one weight values. For example, the empty luggage weight may include weight value(s) of one or more external appendage(s) attached to the external structure of the luggage by a user. In one example, the composite luggage weight may be generated by initial calibration of the internal weighing system. For example, initial calibration may be performed by adjusting a bias value in the scale of the internal weighing system.

In block 270, transmit the composite luggage weight value from the internal weighing system to a display. In one example, the display is housed on the exterior structure of the luggage where it is easily visible to a user.

In block 280, display the composite luggage weight on the display.

FIG. 3 illustrates an example scenario 300 depicting a passenger 390 at home packing his luggage 395 for air travel. In one example, the luggage 395 includes a floor panel 330 which defines the space 310 within the luggage 395 for housing content. In one example, as the passenger 390 puts content 320 into the space 310, the passenger 390 can, from time to time, close the luggage (e.g., by closing the opening panel 380) and position the luggage 395 in a vertical position to view the display 350 for the composite luggage weight.

Thus, this process (e.g., sequence) allows the passenger 390 to determine whether he has overpacked his luggage beyond the weight limit or not. And, as such, the passenger 390 can determine how much more content 320 he can fit into his luggage or if it is necessary to take out content 320. Thus, by having the ability to determine the composite luggage weight without an external weighing device (example at a home environment), the passenger 390 has the assurance that he would not have to unpack his luggage at the airport to address an overweight problem.

In one example, by positioning the luggage 395 in a vertical position, the internal weighing system is automatically turned ON. In one example, the internal weighing system turns OFF automatically following one of the following scenarios: once the measuring of the content weight is done, the calculation of the composite luggage weight is completed and/or the composite luggage weight is transmitted to the display. In one example, the user may manually turn the internal weighing system ON or OFF.

In another example, an internal weighing system 140, 340 (shown in FIGS. 1 & 3) may be included in other types of containers beyond just the luggage 100, 300 (shown in FIGS. 1 & 3) to achieve a self determined weight container. In one example, the internal weighing system is housed within a weighing system compartment 315.

Figure 4:
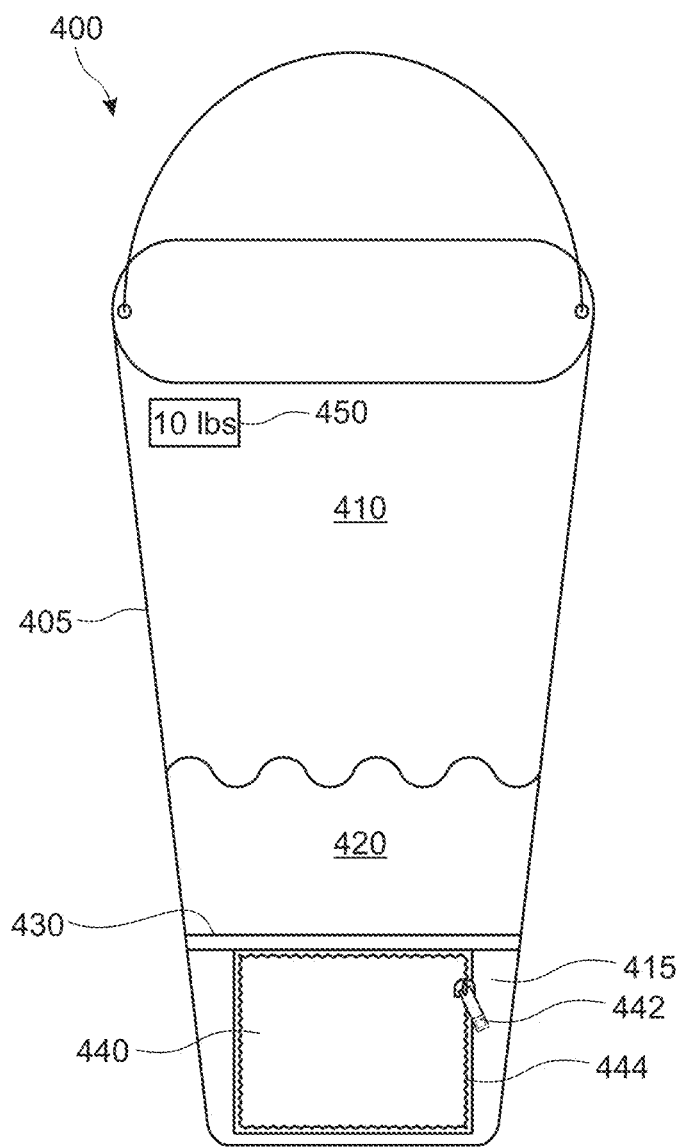
FIG. 4 illustrates an example of a self determined weight bucket.

FIG. 4 illustrates an example of a self determined weight bucket 400. In one example, the self determined weight bucket 400 includes a housing 405, a bucket content holder 410, a bucket floor panel 430, a weighing system compartment 415 and an internal weighing system 440. In one example, the weight of the bucket 400 without any content 420 (not shown) labeled as "empty bucket weight" is determined. The empty bucket weight is then inputted to the internal weighing system 440 as a baseline weight value.

In one example, the weight of the bucket floor panel 430 is part of the baseline weight value. In one example, the bucket floor panel 430 is coupled to the internal weight system 440 such that the weight of the content 420 (e.g., water, other liquid, etc.) is measured by the internal weight system 440 when the bucket 400 is positioned in a vertical position. In one example, vertical position is defined as having the floor panel 430 vertically on top of the internal weight system 440 and the content 420 is vertically on top of the floor panel 430. In one example, a composite bucket weight is the sum of the empty bucket weight and the weight of the content 420. In one example, the composite bucket weight is shown on a bucket display 450. In one example, access to the internal weight system 440 is through a zipper 442 being moved along a zipper track 444.

One skilled in the art would understand that the bucket 400 may include any shape and/or any size, and in one example, may hold any type of content, including liquid content, solid content, a mix of liquid and solid content, etc. One skilled in the art would understand that the present disclosure is not confined to a self determined weight bucket or a self determined weight luggage and that self determined containers of all sizes and/or shapes are also within the scope and spirit of the present disclosure.

Figure 5:
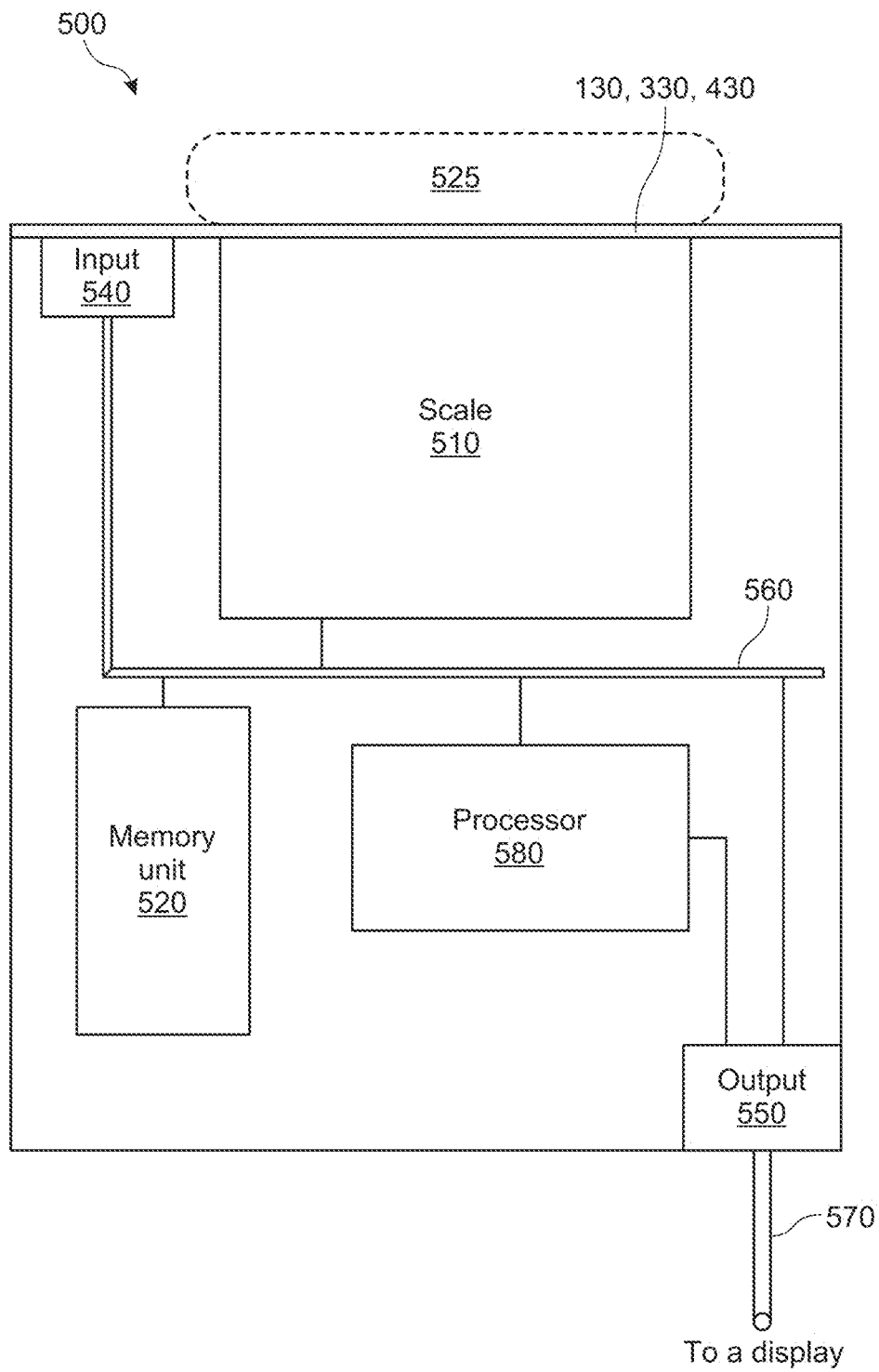
FIG. 5 illustrates an example of an internal weighing system.

FIG. 5 illustrates an example of an internal weighing system 500. In one example, the internal weighing system 500 includes a scale 510, a memory unit 520, an input 540, an output 550, an interconnection databus 560, a signal connection line 570 and a processor 580. In one example, one or more components of the internal weighing system 500 is removable for replacement. That is, in one example, one or more components of the internal weighing system 500 is a modular component and may be removed for replacement with ease.

In one example, the signal connection line 570 hardlines the output 550 to the display 150, 350, 450 (shown in FIGS. 1, 3 & 4) to allow transmission of data to the display, for example, to transmit the composite luggage weight to the display 150, 350, 450 (shown in FIGS. 1, 3 & 4) from the output 550. That is, in this example, the output and the display are wired (via the signal connection line 570) to each other. In another example, a connection between the output 570 and the display is achieved wirelessly.

In one example, the internal weighing system 500 is removable. In one example, removal of the internal weighing system 500 from a weighing system compartment 515 (not shown) does not require removal of the signal connection line 570. That is, the signal connection line 570 may remain connected as is to the display 150, 350, 450 (shown in FIGS. 1, 3 & 4). In one example, the manufacturer may determine the weight of the internal weighing system 500 and may store the weight of the internal weighing system 500 for access as needed. In the event the internal weighing system 500 is removed, a user may initiate the processor 580 to subtract the weight of the internal weighing system 500 when calculating the composite luggage weight. In one example, the weighing system compartment 515 includes one or more sensors (not shown) which detect the removal of the internal weighing system 500 and alerts the processor 580 to subtract the weight of the internal weighing system 500 when calculating the composite luggage weight. In one example, the weighing system compartment 515 includes one or more sensors (not shown) which detect the removal of one or more components of the internal weighing system 500 and alerts the processor 580 to subtract the weight of the removed component(s) when calculating the composite luggage weight.

In one example, the input 540 allows for receipt of data to the internal weighing system 500. In one example, the empty luggage weight may be inputted for storage in the memory unit 520 through the input 540. In one example, other weight values of, for example, external appendages may be inputted for storage in the memory unit 520 through the input 540. In one example, a user may input additional weight values for storage in the memory unit 520 through the input 540. For example, a user may anticipate that he will be adding additional content at a later time but would like the composite luggage weight to account for the anticipated content's weight value. Thus, the user may input one or more additional weight values for storage in the memory unit 520 through the input 540. Data (such as weight values, etc.) that is inputted through the input 540 may be transmitted through the interconnection databus 560 to any of the components of the internal weighing system 500 such as, but not limited to, the memory unit 520 and/or the processor 580. In one example, weight values of the components of the internal weighing system 500 are stored in the memory unit 520.

In one example, the scale 510 is coupled to the floor panel 130, 330, 430 (shown in FIGS. 1, 3 & 4) to weigh the content 525. In one example, the scale 510 may be an analog scale or a digital scale for weighing contents that are atop the floor panel 130, 330, 430 (shown in FIGS. 1, 3 & 4). In one example, the scale 510 is modular, such that the scale 510 may be individually replaced without affecting any of the other components of the internal weighing system 500. Any measured weight value calculated by the scale 510 may be transmitted to the processor 580 though the interconnection databus 560. In another example, any measured weight value calculated by the scale 510 may be transmitted to the memory unit 520 for storage. In one example, the scale 510 is a weight scale.

In one example, the memory unit 520 includes a battery 522 (not shown), wherein the battery 522 may be replaceable as needed. In one example, the battery 522 is rechargeable. In one example, the memory unit 520 is used to store data such as the empty luggage weight and/or the weight of the floor panel 130, 330, 430 (shown in FIGS. 1, 3 & 4). In one example, multiple empty luggage weight values may be stored in the memory unit 520. For example, multiple weight values of multiple external appendages (e.g., a travel sleep pillow, an additional bag to be attached to the luggage, a water bottle hooked to the luggage, etc.) attached to the luggage may be stored in the memory unit 520. In one example, external appendages are attachments to the external structure of the luggage and are added by a user.

In one example, the value of the empty luggage weight and the multiple weight values may be entered through the input 540 for storage in the memory unit 520. In one example, the empty luggage weight may include the weight value of the luggage without any content, but may include one or more weight values of external appendages attached to the luggage's external structure. The value of the empty luggage weight and the multiple weight values that are inputted through the input 540 may be transmitted through the interconnection databus 560 to any of the components of the internal weighing system 500 such as, but not limited to, the memory unit 520 and/or the processor 580.

In one example, the processor 580 is an adding circuit configured to sum up (i.e., add) the empty luggage weight and the content weight to calculate a composite luggage weight. In one example, the processor 580 is coupled to an output 550 directly. In one example, the processor 580 is coupled to the output 550 through the interconnection databus 560. Once calculated, the value of the composite luggage weight is outputted to the display 150, 350, 450 (shown in FIGS. 1, 3 & 4). And, upon receipt of the composite luggage weight, the display 150, 350, 450 (shown in FIGS. 1, 3 & 4) displays the value of the composite luggage weight for viewing by a user. In one example, the value of the composite luggage weight may be displayed in kilograms, pounds or any other suitable mass units.

In one example, the processor 580 may be programmable by a user. For example, a user may program the processor 580 not to include the empty luggage weight when generating the composite luggage weight. In another example, a user may program the processor 520 to include or exclude one or more multiple weight values of multiple external appendages. In one example, a user may input a weight value to be added when generating the composite luggage weight.

In one example, the disclosure discloses an apparatus including: a space for holding content; a weighing system for measuring a weight value of the content; a weighing system compartment for housing the weighing system; and a floor panel, wherein the placement of the floor panel determines a first area dimension for the space and a second area dimension for the weighing system compartment.

In one example, the apparatus further includes a display coupled to the weighing system, the display configured to display the weight value received from the weighing system. In one example, the weighing system includes the following: a scale configured to measure the weight value; a databus coupled to the scale, the databus configured to transport the weight value; and a processor coupled to the databus, the processor configured to calculate a composite luggage weight based on the weight value.

In one example, the apparatus further includes a display coupled to the processor, the display configured to display the composite luggage weight for viewing. In one example, the apparatus further includes a signal connection line coupled to the processor, the signal connection line configured to transmit the composite luggage weight to the display. In one example, the signal connection line is a wireless transmission path.

In one example, the apparatus further includes an output coupled to the signal connection line, the output configured to receive data from the processor and to output the data via the signal connection line.

In one example, the apparatus further includes a memory unit coupled to the databus, the memory unit configured to store one or more weight measurements. In one example, the one or more weight measurements includes one or more of the following: an empty luggage weight, a weight of the floor panel, a weight of one or more external appendages, and a weight of the weighing system.

In one example, the apparatus further includes an output coupled to the signal connection line, the output configured to receive data from the processor and to output the data via the signal connection line. In one example, the data is the composite luggage weight.

In one example, the apparatus further includes an input coupled to the database, the input configured to receive data for storage in the memory unit. In one example, the data is one or more of the following: an empty luggage weight, a weight of the floor panel, a weight of one or more external appendages, and a weight of the weighing system. In one example, the apparatus is a luggage.

In one example, the apparatus further includes at least two wall supports for placement of the floor panel, wherein a vertical position of the floor panel is adjustable based on location of the at least two wall supports. In one example, one or more components of the weighing system is removable. In one example, the weighing system compartment includes one or more sensors configured to detect absence of one or more components of the weighing system. In one example, the processor is further configured to retrieve a weight value of each of the one or more component detected as absent and generate a total absent weigh value. In one example, the processor is further configured to calculate the composite luggage weight by taking into account the total absent weight value.

In one aspect of the disclosure, the term "weight" and "weight value" may be used interchangeably and synonymously.

In one aspect, one or more of the steps for providing a self determined weight container in FIG. 2 may be executed by one or more processors which may include hardware, software, firmware, etc. The one or more processors, for example, may be used to execute software or firmware needed to perform the steps in the flow diagram of FIG. 2. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
   a space for holding content;
   a weighing system for measuring a weight value of the content;
   a weighing system compartment for housing the weighing system, wherein the weighing system compartment includes one or more sensors configured to detect absence of one or more components of the weighing system;
   a processor coupled to the one or more sensors, the processor configured to identify a tare weight amount of the one or more components that is absent; and
   a floor panel, wherein the placement of the floor panel determines a first area dimension for the space and a second area dimension for the weighing system compartment.

2. The apparatus of claim 1, further comprising a display coupled to the weighing system, the display configured to display the weight value received from the weighing system.

3. The apparatus of claim 1, wherein the weighing system comprises the following:
   a scale configured to measure the weight value;
   a databus coupled to the scale, the databus configured to transport the weight value; and the processor further configured to calculate a composite luggage weight based on the weight value and a subtraction of the weight amount.

4. The apparatus of claim 3, further comprising a display coupled to the processor, the display configured to display the composite luggage weight for viewing.

5. The apparatus of claim 4, further comprising a signal connection line coupled to the processor, the signal connection line configured to transmit the composite luggage weight to the display.

6. The apparatus of claim 5, wherein the signal connection line is a wireless transmission path.

7. The apparatus of claim 6, further comprising an output coupled to the signal connection line, the output configured to receive data from the processor and to output the data via the signal connection line.

8. The apparatus of claim 5, further comprising a memory unit coupled to the databus, the memory unit configured to store one or more weight measurements.

9. The apparatus of claim 8, wherein the one or more weight measurements includes one or more of the following: an empty luggage weight, a weight of the floor panel, a weight of one or more external appendages, and a weight of the weighing system.

10. The apparatus of claim 8, further comprising an output coupled to the signal connection line, the output configured to receive data from the processor and to output the data via the signal connection line.

11. The apparatus of claim 10, wherein the data is the composite luggage weight.

12. The apparatus of claim 8, further comprising an input coupled to the database, the input configured to receive data for storage in the memory unit.

13. The apparatus of claim 12, wherein the data is one or more of the following: an empty luggage weight, a weight of the floor panel, a weight of one or more external appendages, and a weight of the weighing system.

14. The apparatus of claim 1, wherein the apparatus is a luggage.

15. The apparatus of claim 3, wherein the apparatus is a luggage.

16. The apparatus of claim 1, further comprising at least two wall supports for placement of the floor panel, wherein a vertical position of the floor panel is adjustable based on location of the at least two wall supports.

17. The apparatus of claim 1, wherein one or more components of the weighing system is removable.

18. The apparatus of claim 1, wherein the processor is further configured to retrieve a weight value of each of the one or more component detected as absent and generate a total absent weigh value.

19. The apparatus of claim 18, wherein the processor is further configured to calculate the composite luggage weight by taking into account the total absent weight value.

* * * * *